(12) United States Patent
Monaco

(10) Patent No.: US 6,840,030 B1
(45) Date of Patent: Jan. 11, 2005

(54) THATCHING ATTACHMENT FOR A ROTARY POWER LAWN MOWER

(76) Inventor: John A. Monaco, 2213 Ridgemont Dr., Anchorage, AK (US) 99507

(*) Notice: Subject to any disclaimer, the term of this patent is extended or adjusted under 35 U.S.C. 154(b) by 121 days.

(21) Appl. No.: 10/292,782

(22) Filed: Nov. 11, 2002

Related U.S. Application Data

(63) Continuation-in-part of application No. 09/713,605, filed on Nov. 15, 2000, now abandoned, which is a continuation-in-part of application No. 09/311,682, filed on May 13, 1999, now abandoned.

(51) Int. Cl.[7] .............................................. A01F 34/64
(52) U.S. Cl. ........................................... 56/295; 56/255
(58) Field of Search ........................ 56/17.5, 295, 255, 56/400.01, 400.02, 400.04, 400.05, 400.07, 400.16, DIG. 12, DIG. 21, DIG. 17, DIG. 20; 172/42, 111, 711, 96; 15/49.1, 90

(56) References Cited

U.S. PATENT DOCUMENTS

| | | | | |
|---|---|---|---|---|
| 2,281,278 A | * | 4/1942 | Finnell | 15/93.1 |
| 2,676,447 A | * | 4/1954 | Asbury | 56/295 |
| 2,924,059 A | * | 2/1960 | Beeston, Jr. | 56/295 |
| 3,857,226 A | * | 12/1974 | Sifakas | 56/295 |
| 4,062,114 A | * | 12/1977 | Luick | 30/276 |
| 5,123,236 A | * | 6/1992 | Bablitz | 56/17.5 |
| 5,479,763 A | * | 1/1996 | Coble | 56/12.7 |
| 5,615,543 A | * | 4/1997 | Caffey et al. | 56/295 |
| 5,661,962 A | * | 9/1997 | Monaco | 56/16.9 |
| 5,713,191 A | * | 2/1998 | Welton | 56/12.1 |
| 5,761,892 A | * | 6/1998 | Quiroga | 56/17.5 |
| 5,901,448 A | * | 5/1999 | Lingerfelt | 30/276 |

* cited by examiner

Primary Examiner—Thomas B. Will
Assistant Examiner—Meredith Petravick
(74) Attorney, Agent, or Firm—Michael J. Tavella

(57) ABSTRACT

A thatching attachment for a rotary power lawn mower that uses short lengths of nylon trimmer cord as bristles to thatch lawns by mounting the brushes on a blade. The device uses alternatives to bristles and new arrangements of the blades to better groom lawns overall. The new thatching elements work on all types of grasses and perform better than plain nylon bristles. Moreover, these thatching elements last longer and are, therefore, more economical. Finally, my new designs are better at mulching the cuttings, which reduces the amount of waste picked up by the mower. This saves time and cost of bagging and disposal of the waste.

7 Claims, 24 Drawing Sheets

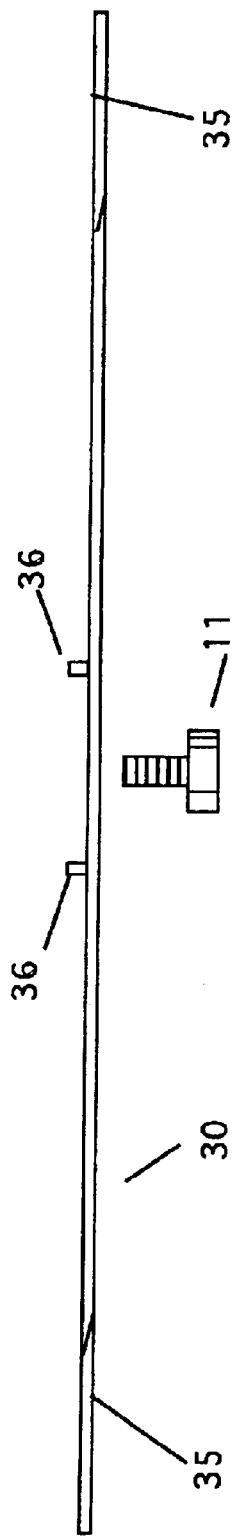
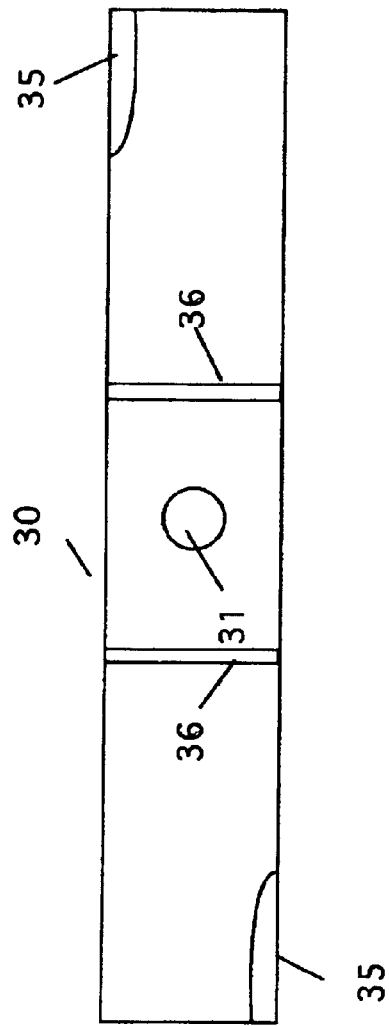

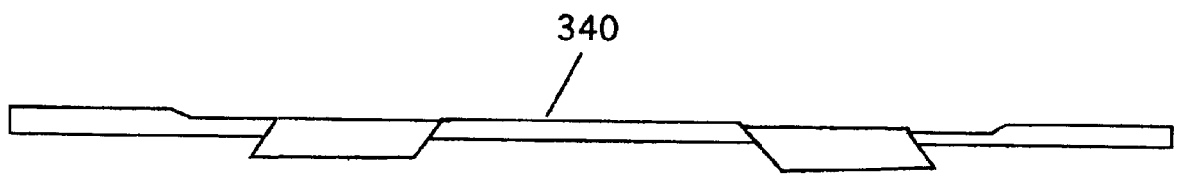
Figure 57
Figure 58
Figure 59

THATCHING ATTACHMENT FOR A ROTARY POWER LAWN MOWER

CROSS REFERENCE TO RELATED APPLICATIONS

This application is a Continuation-in-part of application Ser. No. 09/713,605, filed Nov. 15, 2000, now abandoned, which is a continuation in part of Ser. No. 09/311,682, filed May 13, 1999, now abandoned.

STATEMENT REGARDING FEDERALLY SPONSORED RESEARCH AND DEVELOPMENT

Not Applicable

BACKGROUND OF THE INVENTION

1. Field of the Invention

This invention relates to powered thatching machines and particularly powered thatching machines that use bristle elements for the thatching.

2. Description of Related Art

Power thatching machines have been used for years to groom lawns. Typically, thatching is done in the spring and involves removing as much of the old grass as possible. Thatching should also work to loosen and aerate the soil. Originally, thatching was done by hand using rakes. This process in strenuous at best. Raking is also not the best way to loosen the soil. To make the work easier, several devices have been developed to be used in combination with power drive units, such as lawn mowers. In these devices, the blade of the mower is removed and a new "blade" arm is added. The blade arm has some type of device attached that rakes the ground while the mower is operating. Typically, these devices use metal tines, similar to those found on rakes, to thatch the lawn. Although effective, these metal tines tend to dig excessively into a lawn. If these devices are used improperly, the lawn can suffer severe damage.

In U.S. Pat. No. 5,661,962, I disclosed a device for thatching laws that used a set of brushes mounted on a blade arm. The brushes thatch a lawn by "combing" the lawn surface instead of digging into the lawn. Consequently, the lawn suffers no damage from the process. The action of the brushes also works to loosen the soil, which is an additional benefit of the process.

BRIEF SUMMARY OF THE INVENTION

This invention relates to my previous invention of a thatching attachment for a rotary power lawn mower described in U.S. Pat. No. 5,661,962, which is incorporated herein by reference. As mentioned above, the brush action of my previous patent is an improvement over the metal tines. Since the time that the patent was issued, I have further improved the device. In my original design, I used bristle brushes to thatch lawns by mounting the brushes on a blade that was used with a standard lawn mower blade. I taught that the bristle pattern might be changed by removing some of the bristles to improve the performance of the brushes. In this new design, I now focus on alternatives to bristles and new arrangements of the blades to better groom lawns overall. Primarily, these new bristle elements are short lengths of nylon trimmer line.

When used in short lengths and sufficient thickness, the trimmer line stays in a vertical position, instead of the horizontal position usually used for trimmer line. The new thatching elements work on all types of grasses and perform better than plain nylon bristles. Moreover, these thatching elements last longer and are, therefore, more economical. Finally, my new designs are better at mulching the cuttings, which reduces the amount of waste picked up by the mower. This saves time and cost of bagging and disposal of the waste.

It is an object of this invention to produce a thatching attachment for lawn mowers that has replaceable bristles.

It is another object of this invention to produce a thatching attachment for lawnmowers that has variable bristle patterns within a brush.

It is yet another object of this invention to produce a thatching attachment for lawn mowers that uses a staggered set of bristles to mulch the thatched clippings to reduce the amount of material that must be disposed of after the thatching process is completed.

It is a further object of this invention to produce a thatching attachment for lawn mowers that produces more efficient thatching of lawns by using multiple lengths and types of bristles.

It is yet another object of this invention to produce a thatching attachment for lawn mowers that can thatch different varieties of grass by adjusting the bristle size and type for a particular type of grass.

BRIEF DESCRIPTION OF THE DRAWINGS

FIG. 5 is a front elevation view of a third embodiment of my new thatcher attachment.

FIG. 6 is a top plan detail view thereof.

FIG. 57 is a side view of a second blade for use with a WALKER mulcher deck.

FIG. 58 is an end view of a blade plate to lock the blades in a WALKER mulcher deck.

FIG. 59 is a top view of a blade plate of FIG. 59, used to lock the blades in a WALKER mulcher deck.

DETAILED DESCRIPTION OF THE INVENTION

Figure 1:
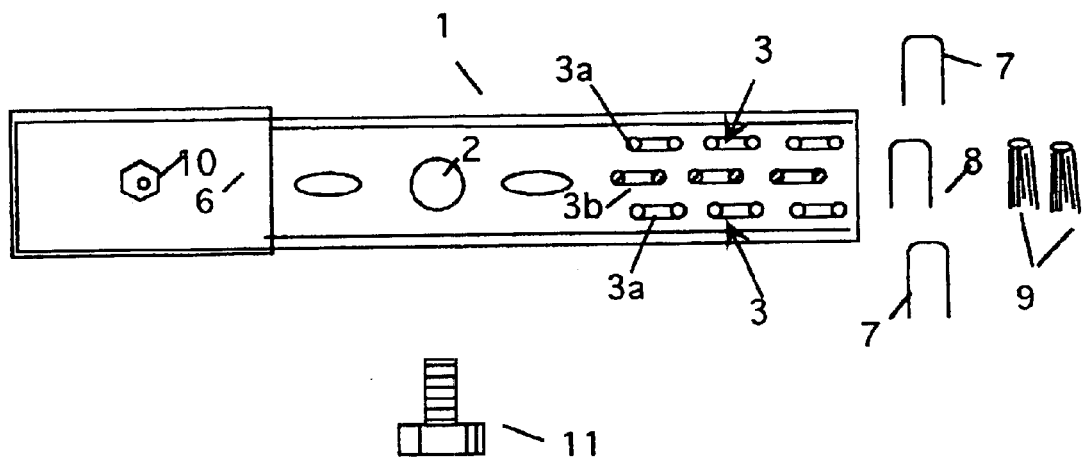
FIG. 1 is a top plan view of one embodiment of my new blade and thatcher design.

Referring now to FIG. 1, the first embodiment of my new design shows a blade, or mounting bar 1 that has a center hole 2 for attaching the blade 1 to a lawn mower drive shaft. Note that throughout this specification the terms blade and mounting bar are synonymous, except as noted. The blade can be a flat bar, or can be a regular lawn mower blade that has been drilled with the proper hole arrangement.

The blade 1 also has a number of hole pairs 3 as shown. These hole pairs 3 are used to hold the thatching elements as described below. Note that FIG. 1 shows these holes 3 only on one side of the blade 1. In fact, the holes are repeated on the other side of the blade 1, but are hidden by the cover 6 as shown. The cover 6 is discussed below.

In this design, several thatching elements may be used. As shown, the outer courses 3a of the blade holes 3 are designed to accept wire rope wire or cable (which may be twisted or braided) 7. The gauge of this wire can vary. As shown in the figure, the wire or cable 7 is folded into a flattened "U" shape for placement into a pair of holes 3 as shown. In the center course of holes 3b, either a folded length of nylon cord 8 or a plug of brush type bristles 9 may be used. The nylon cord 8 is also folded onto a flatted "U" shape and fits into a pair of holes.

In the preferred embodiment, and throughout this specification, the nylon cord or trimmer line 8 is the type used in garden trimmers. This cord comes in various diameters. Ordinarily, trimmer line is used in longer lengths. As the trimmer head is rotated, the trimmer line lies horizontally. This allows the cutter to trim the tops of grass and weeds without digging into the soil. Moreover, when used in such lengths, the trimmer line is too flexible to dig into the soil. The length and thickness of trimmer line used in the instant application are designed to keep the trimmer line vertical during use. In other words, the line is so short and thick that it will not lie horizontally when the trimmer head is turning. This ensures that the trimmer line acts as a bristle to work down into the grass instead of riding atop it. In this way, the instant invention can dethatch and work a lawn in a completely different manner than a standard weed trimmer with standard length line can.

To make the trimmer line stay vertical, its length and thickness must be coordinated. Thinner line must be kept shorter than thicker line. In any event, the thickest line should extend not more than 2 inches (50 mm) below the bottom of the carrier bar or cutting blade. In the preferred embodiment, the thickness and length of various trimmer lines are as follows: For line having a cross-section or diameter of 0.065, 0.080, and 0.095 inches, the lengths should be between ⅛ inch and ½ inch. For cross-section or diameter of 0.105 and 0.130 inches, the lengths should be between ½ inch and 1½ inches. Finally, for cross-section or diameter of 0.155 and 0.170 inches, the lengths should be between ½ inch and 2 inches.

Note that the nylon trimmer line can be any of the available lines such as: square, twisted or braided. Moreover, other sizes may be used as well; although the sizes listed above are the preferred. Finally, it is also possible to mix various thicknesses and lengths on a carrier bar, see, e.g., FIG. 15.

Figure 2:
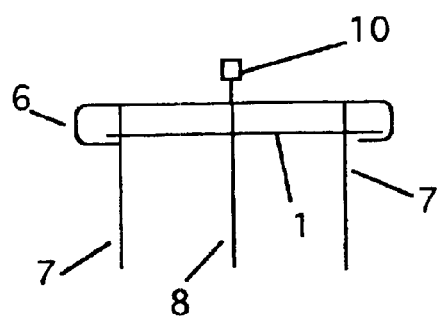
FIG. 2 is an end detail view thereof.

The bristle plugs 9 are placed one by one into single holes. To secure the thatching elements in place for use, a cover 6 is slid over the end of the blade (see FIG. 2) and on top of the holes 3 and thatching elements. A fastener 10 is used to secure the cover 6 to the blade 1. Two covers 6 are needed for each blade. Once the covers are in place, the blade 1 can be attached to a lawn mower using a bolt 11 through the hole 2.

Figure 3:
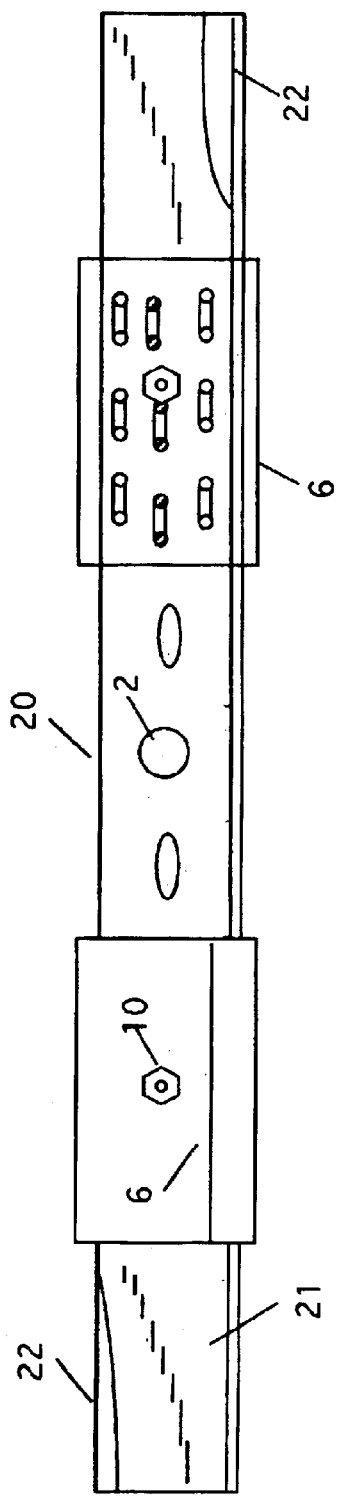
FIG. 3 is a top plan view of a second embodiment of my new attachment.
Figure 4:
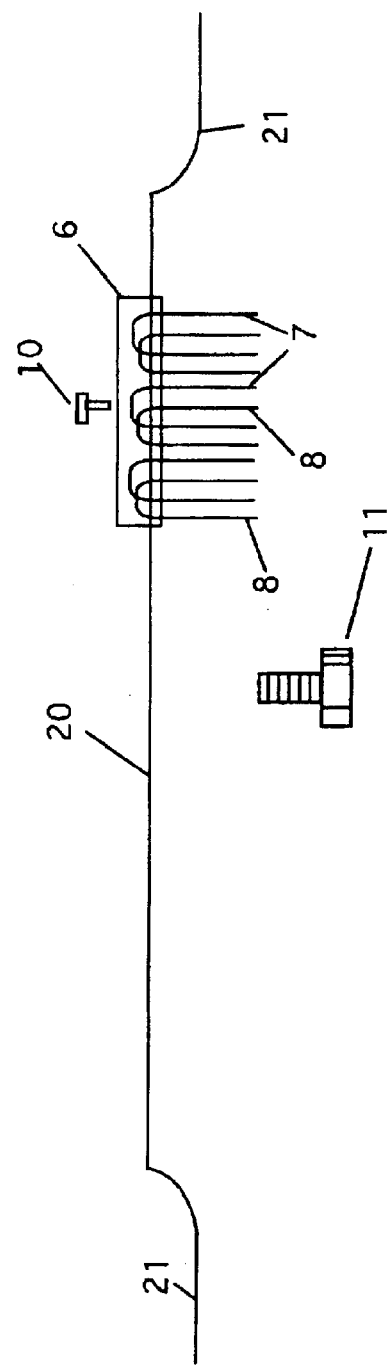
FIG. 4 is a front elevation view thereof.

FIG. 3 shows an adaptation of this design. Here, the thatching elements, covers and fasteners remain the same. The difference is in the ends of the blade 20. The blade 20 has two extensions 21 as shown. The blade extensions 21 are bent into a curve as shown. The edges 22 of the blade are then sharpened to a cutting edge as shown. (See FIG. 3.) FIG. 4 shows the ends of the blade 20 with the curved ends. FIG. 4 also shows the various bristle elements and the cover, as discussed above.

Figure 7:
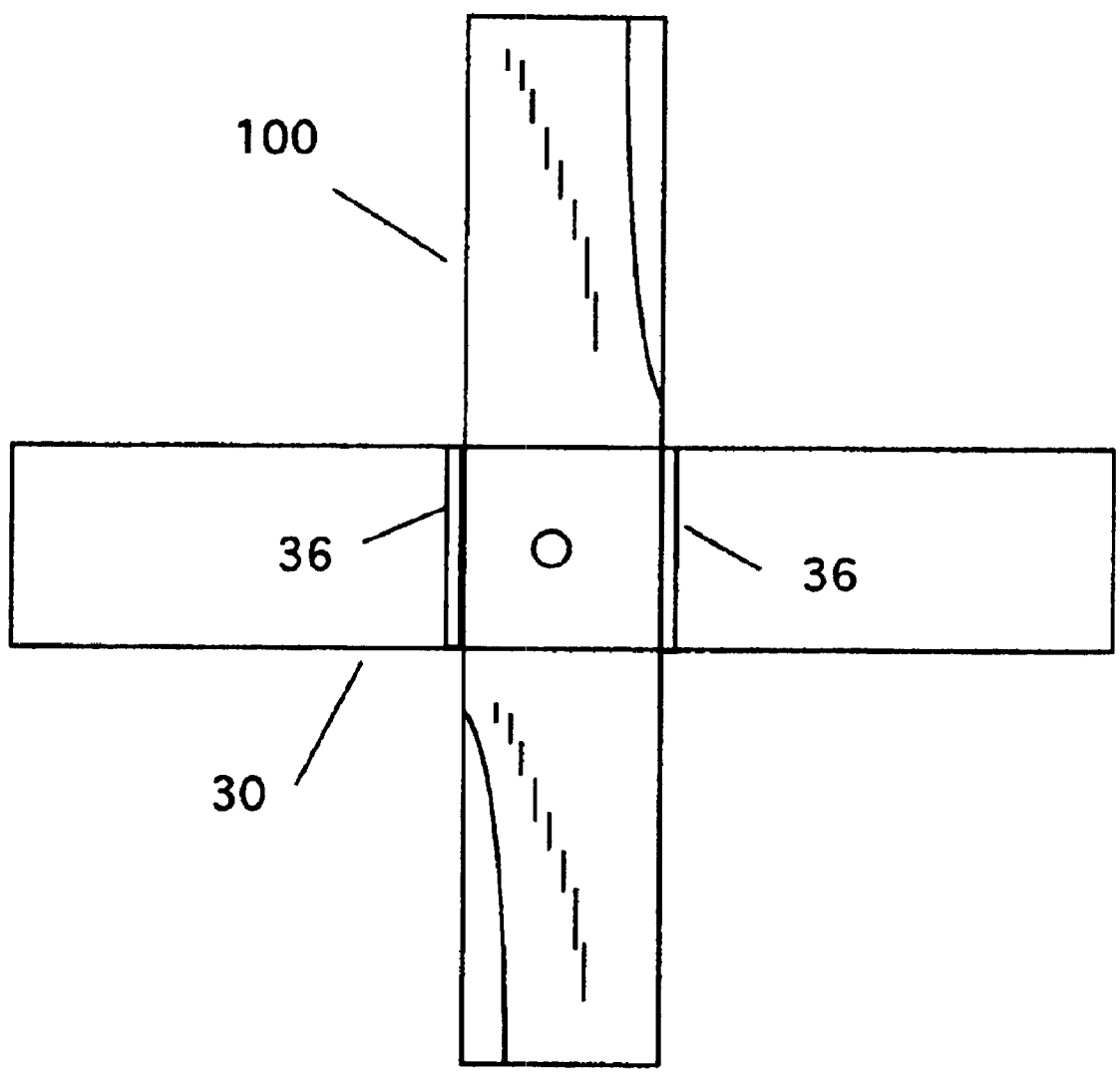
FIG. 7 is a top plan view of the third embodiment in place on a lawn mower blade.

FIGS. 5–7 show yet another embodiment of this design. Here, the thatching blade 30 is flat. At the center of the thatching blade 30 is a mounting hole 31 as shown. The thatching blade 30 has a number of mounting holes for bristle elements, as discussed above that are not shown here for clarity. As above, the twisted cable, nylon cord, wire or brush type bristles may be used either separately or in combination. This blade 30 is intended to be used in conjunction with a standard mower-cutting blade 100. Two support flanges 36 are formed on the top of the blade 30 as shown. These flanges hold the mower blade 100 in place and prevent the mower blade from turning with respect the thatcher blade 30. FIG. 6 shows a top view of the thatcher blade 30 showing the flanges 36. FIG. 7 shows the thatching blade 30 placed under the standard mower blade 100. The standard mower blade aligns with the flanges 36 to maintain the position of the mower blade, as discussed above.

Figure 8:
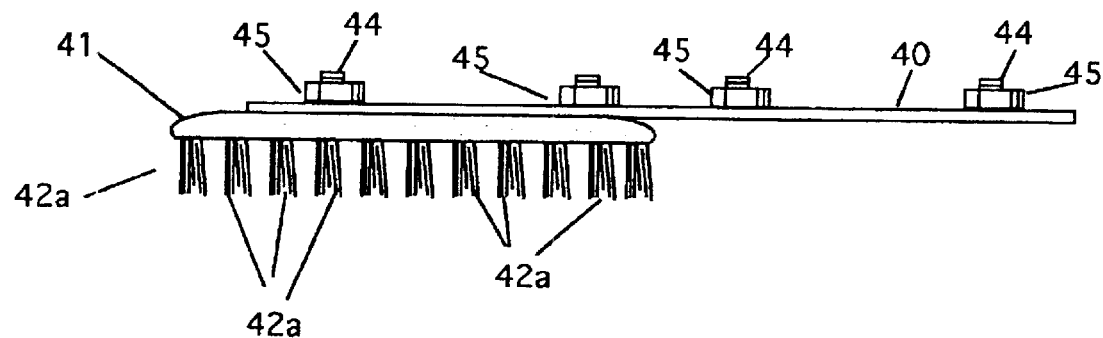
FIG. 8 is a partial front elevation view of a fourth embodiment of my new design.
Figure 9:
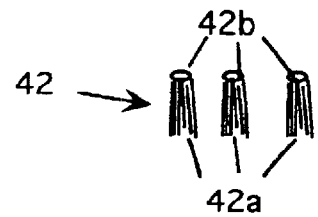
FIG. 9 is a side detail view of my new bristle plugs.
Figure 10:
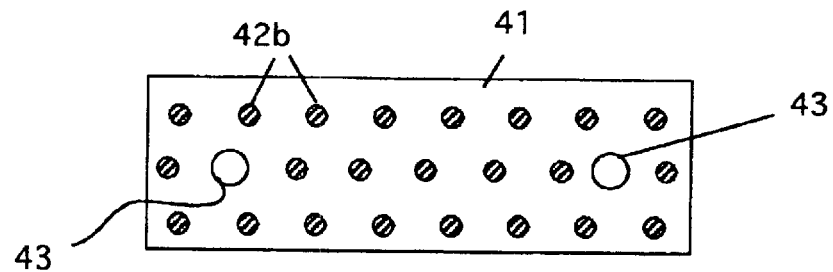
FIG. 10 is a top detail view of the brush block of the fourth embodiment.

FIGS. 8, 9 and 10 show yet another embodiment of my new thatching system. This embodiment uses a structure very similar to my original design found in U.S. Pat. No. 5,661,962. FIG. 8 shows a partial side view of the blade 40. In this embodiment, the blade 40 is also called a carrier bar. Secured to the carrier bar 40 is a brush block 41. In my original design, this block has permanently installed bristles, arranged in a pattern. In this embodiment, the brush block 41 has a number of holes cut into it to allow bristle elements 42, shown in FIG. 9, to be placed into the brush block 41. The individual bristle elements 42 can be made of nylon, plastic, wire, wood fiber, or any similar type material. The bristle elements 42 have a number of bristles 42a and a molded head 42b. See FIG. 9. The molded head 42b is used to hold the bristle elements 42 in the brush block 41. FIG. 10 shows a top view of the brush block 41 with the bristle elements in place. Note that this figure shows the molded heads 42b secure in the brush block 41. The brush block 41 has two mounting holes 43 as shown to secure it to the carrier bar 40, using bolts 44 and nuts 45 as shown in FIG. 9. Note that in practice, two brush blocks are mounted to the carrier bar 40. The brush block 41 can be made of hard nylon, from a softer, resilient belting rubber, metal, or from any similar type material. Use of the rubber allows more "give" in the block, which improves performance over uneven terrain. Note that this brush block 41 may be attached to other blades discussed above. For example, they can be attached to the blade of FIG. 3.

Figure 11:
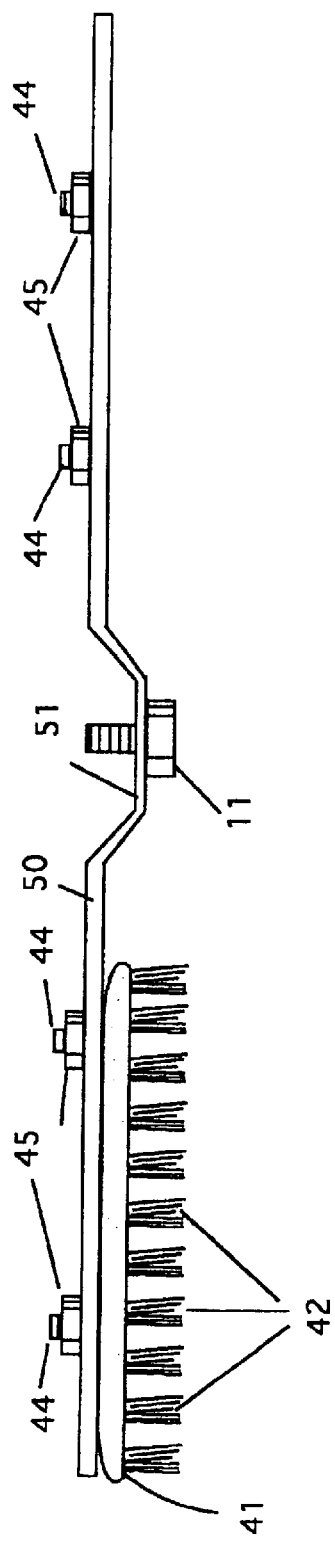
FIG. 11 is a front detail view of a new attachment bar design.

FIG. 11 shows another variation on this design. Here, the brush blocks and bristle elements are the same. The carrier bar 50, has been modified by articulating the center portion 51 as shown. In this design, a normal mower blade 100 is secured between the sloped sides of the carrier bar 50.

Figure 12:
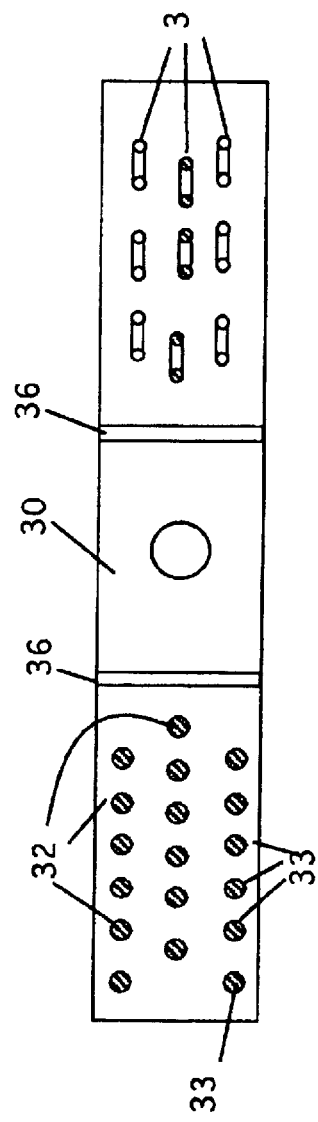
FIG. 12 is a top plan view of the fifth embodiment.
Figure 13:
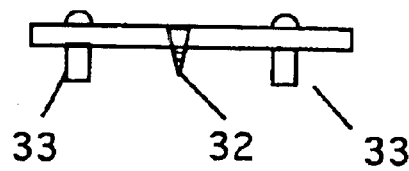
FIG. 13 is an end detail view of a fifth embodiment of my new design.
Figure 14:
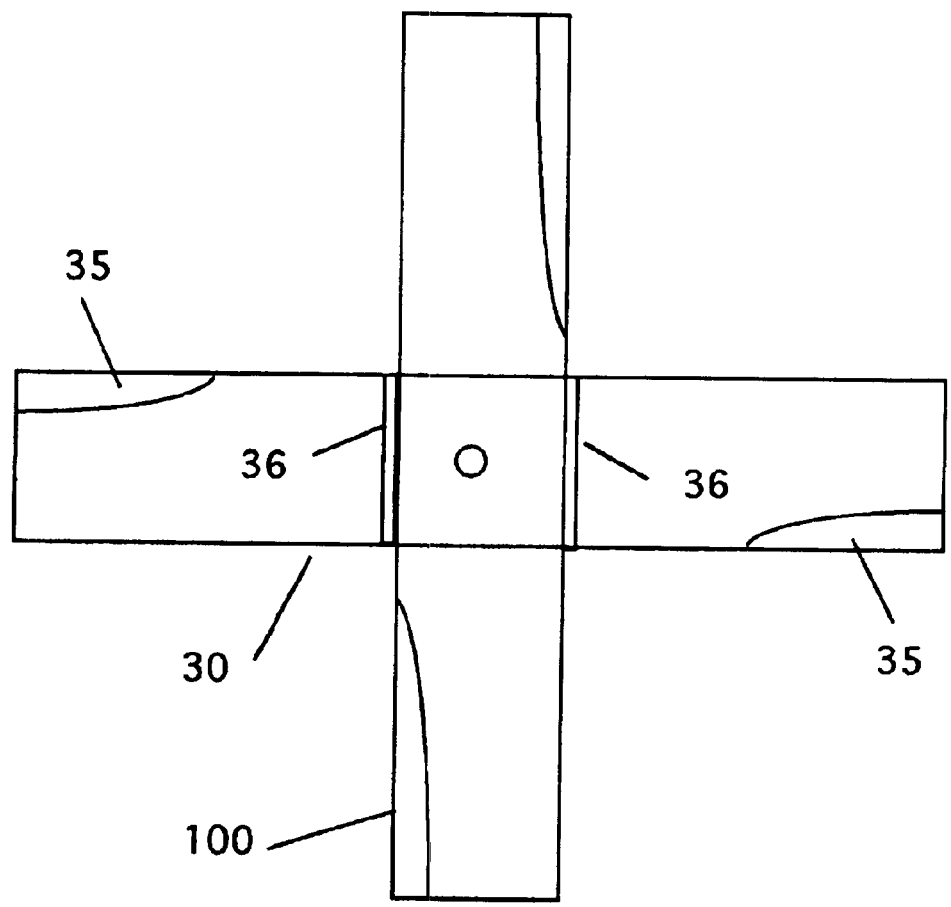
FIG. 14 is a top plan detail view of the fifth embodiment in place on a lawn mower blade.
Figure 15:
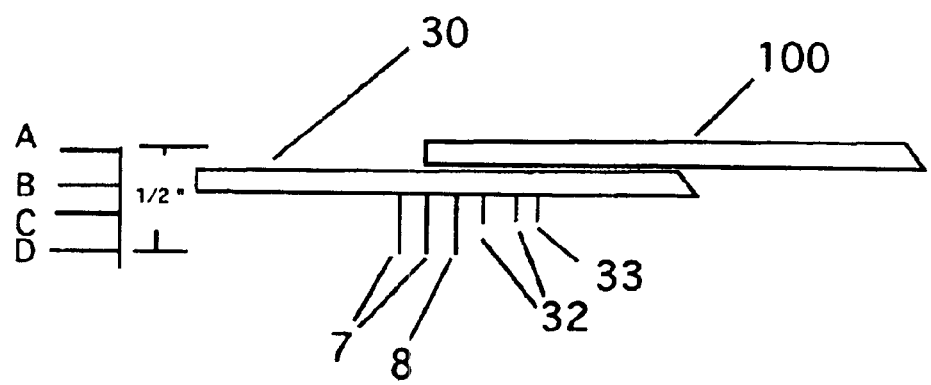
FIG. 15 is a detail view of the cutting edges of the fifth embodiment and the preferred spacing thereof.

Referring now to FIGS. 12–15, another embodiment if my design is shown. In this embodiment, the flat carrier bar 30 of FIGS. 5–7 is used. Here, the carrier bar is fitted with screws, bolts, nylon strips, bristles or wire. Note the discussion above on the use of nylon trimmer line for this application. This blade 30 also has provisions for using screws 32 or bolts 33 as grass cutting or chipping elements. These elements pick up the grass cuttings and reduce them in size and volume, as discussed below. See FIG. 13. The length of the screws and bolts can vary. They are screwed into tapped holes in the blade 30 using ordinary tapping techniques. The bolts 33 and screws 32 can be used in combination with any of the bristle elements discussed above. Also, in this embodiment, the ends of the thatching blade 30 may be sharpened to a cutting edge 35 as shown. The layout is such that the bristle elements form a graduated system of cutting and chipping the grass. FIGS. 12 and 13 show the placement of the screws and nuts. FIG. 14 shows the placement of the two blades. FIG. 15 shows the stepped levels of cutting and chipping. In the preferred embodiment, there are four levels, A, B, C, and D, of cutting and chipping approximately ⅛ inch apart. Here, longer lengths of nylon or wire can be used to groom the lawn while shorter lengths of wire or screws are used to cut and mulch the grass, thereby reducing the bagged volume of material that is caught by the mower. This system reduces bagged volume by as much as three to one over conventional mower blades. In this embodiment, the blades are attached to the mower in the configuration shown in FIG. 14. The mower is then used normally, and the blades, wires, screws and bolts automatically cut and groom the lawn.

Figure 16:
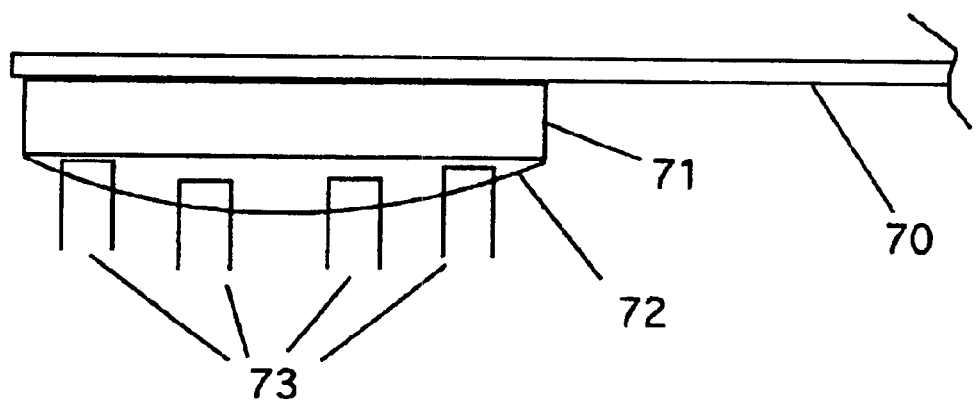
FIG. 16 is a cross-sectional view of one side of a sixth embodiment of the invention.
Figure 17:
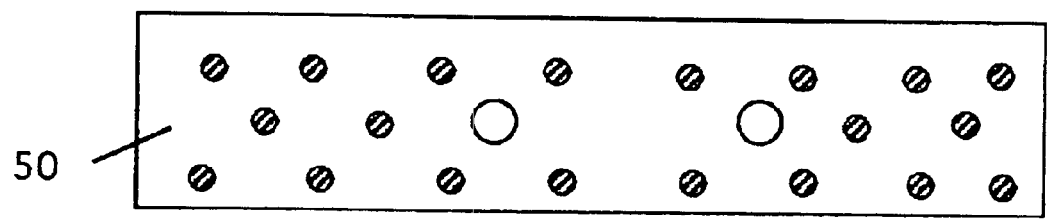
FIG. 17 is a top view of a seventh embodiment of the invention showing the bottom of a cap with the bristles extending out from the top of the cap.

FIG. 16 shows yet another embodiment. Here, a cross sectional view of the embodiment is shown. A flat blade 70 is used to hold a pair of blocks 71. (The figure shows only one block.) These blocks 71 are preferably made of resilient rubber belting, or similar material. The blocks 71 are attached to the blade 70 using the same methods as those described above. An element support cup 72 is attached to the underside of each of the blocks 71 as shown. The support cups 72 are attached using method common to the art. The support cups 72 are curved to bow out from the blocks 71. The support cups 72 have a number of holes formed in them to receive a number of elements 73. These elements are the same as those discussed above: bristles, wire, nylon strips, screws, or bolts. The patterns for the distribution of the elements 73 are identical to those described above. The difference between this embodiment and the others is that the support cup 72 creates an open space between the surface of the cup and surface of the block 71. This space allows the support cup 72 and the elements 73 to move with respect to the block 71 when the blade is moving over uneven ground. Instead of the elements digging in to a high spot, the support cup allows the elements to retract somewhat over these high spots. This produces a uniform treatment for the lawn.

FIGS. 17–20 show another embodiment. In this embodiment, a cap 50 is formed similar to the cap of FIG. 2. In this cap, however, the bristle elements are placed from the inside of the cap and extend out of the top of the cap. The cap is then placed on the bottom of the blade and bolted into place. This embodiment allows the use of preformed blades. Mounting the cap with the bristle elements only requires one or two mounting holes per cap. Instead of the many holes required in the embodiment of FIG. 1.

Figure 18:
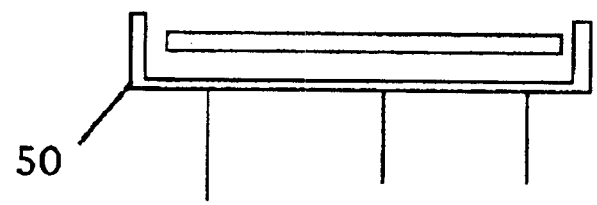
FIG. 18 is an end view of the cap of FIG. 17 being mounted on the bottom of the blade.
Figure 19:
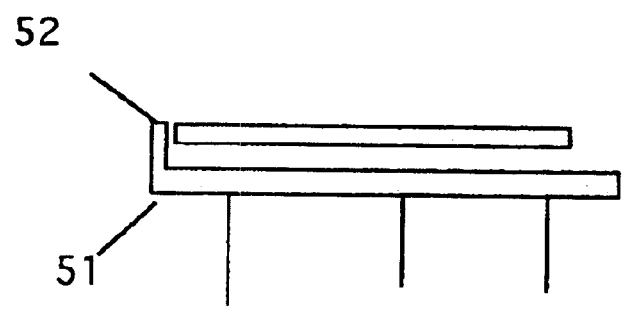
FIG. 19 is a modified inverted cap that has a lip only on the leading edge of the cap.

FIG. 18 shows an end view of the cap 50 in place on the bottom of a blade. FIG. 19 shows a cap 51 that is a modification of cap 50. Cap 51 has only one vertical flange 52 that covers the leading edge of the blade. This is done to prevent the buildup of grass and dirt between the cap 51 and the blade.

Figure 20:
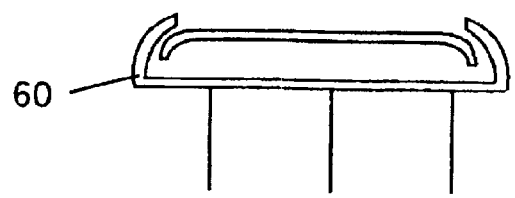
FIG. 20 is a modified version of the inverted cap in which the upper edges are curved to fit over a curved blade.

FIG. 20 shows a cap 60 that is another variation of the basic cap. In this cap, the flanges are curved to fit the curved edges on certain types of blades. Here the cap 60 is slid over the end of blade and bolted into position as before.

In all cases of the clips 50, 51, and 60, the bristle elements are placed from the inside out as shown in the figures.

Figure 21:
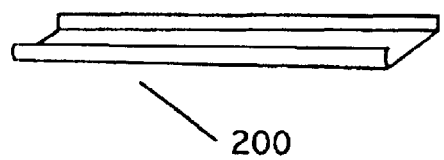
FIG. 21 is a side view of a clip type A used to hold trimmer line when mounted on a carrier bar used in the eighth embodiment of the invention.

FIGS. 21–67 show another set of embodiments. These embodiments cover designs of blades and carrier bars suitable for use with WALKER brand type mowers, as, as noted, other types of walk behind style mowers. The new embodiments also use clips similar to those described above. In these embodiments, there are three types of clips. FIG. 21 is a side view of a clip type A 200 used to hold trimmer line when mounted on a carrier bar as described below. This clip 200 has mounting holes 201 and pairs of holes 202 for the trimmer line 205.

Figure 23:
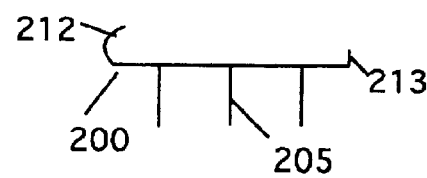
FIG. 23 is an end view of the clip shown in FIG. 21.
Figure 22:
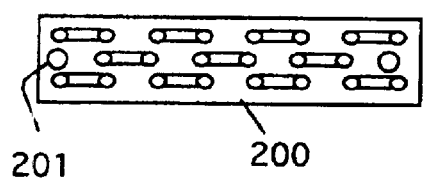
FIG. 22 is a top view of the clip shown in FIG. 21.
Figure 24:
FIG. 24 is an end view of a carrier bar used in the eighth embodiment of the invention.

FIG. 22 is a top view of the clip shown in FIG. 21 showing the trimmer line 205 in place. FIG. 23 is an end view of the clip shown in FIG. 21. Note the curved leading edge 212 and the straight back edge 213. FIG. 24 is an end view of a carrier bar 210 used in the eighth embodiment of the invention.

Figure 25:
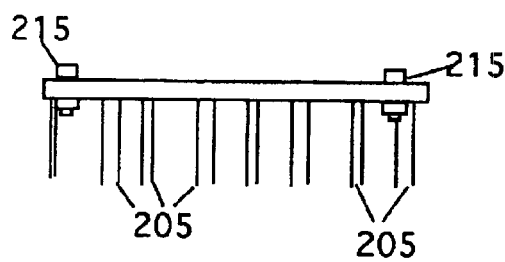
FIG. 25 is a side view of the clip of FIG. 21 with trimmer line installed, and bolt installed to install it on a carrier bar.
Figure 26:
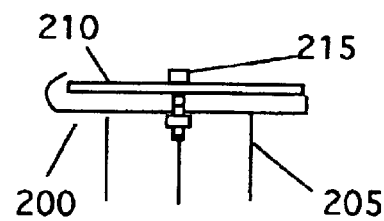
FIG. 26 is an end view of the clip of FIG. 25 shown mounted on a carrier bar.

FIG. 25 is a side view of the clip of FIG. 21 with trimmer line installed, and bolts 215 installed to install it on a carrier bar. FIG. 26 is an end view of the clip of FIG. 25 shown mounted on a carrier bar. Note the bolts 215, securing the cap to the bar.

Figure 27:
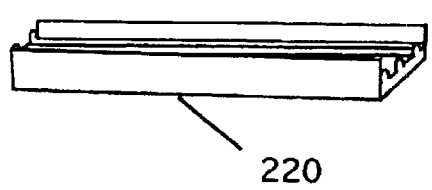
FIG. 27 is a side view of a clip type B used to hold trimmer line when mounted on a carrier bar used in the eighth embodiment of the invention.
Figure 29:
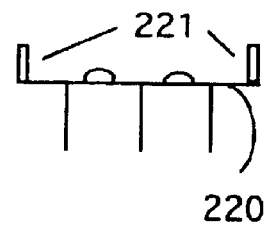
FIG. 29 is an end view of the clip shown in FIG. 27.
Figure 28:
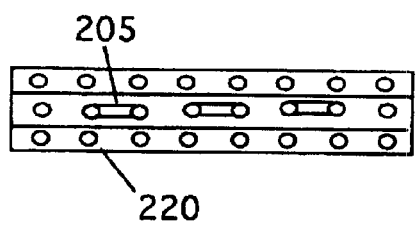
FIG. 28 is a top view of the clip shown in FIG. 27.

FIG. 27 is a side view of a clip type B 220 used to hold trimmer line when mounted on a carrier bar used in the eighth embodiment of the invention. Note that this cap has a set of sidewalls 221 that isolate the trimmer line and help to keep the cap from being plugged up with dirt. FIG. 28 is a top view of the clip shown in FIG. 27. FIG. 29 is an end view of the clip shown in FIG. 27. Both of these views show trimmer line 205 in place.

Figure 30:
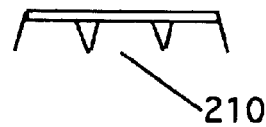
FIG. 30 is an end view of a carrier bar used in the eighth embodiment of the invention.

FIG. 30 is an end view of a carrier bar 210 used in the eighth embodiment of the invention.

Figure 31:
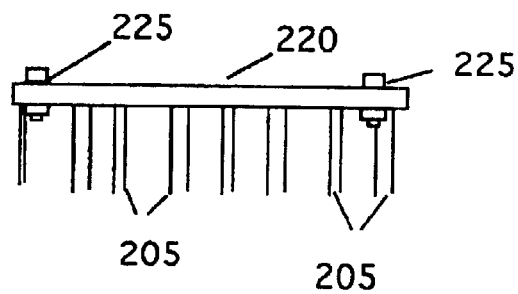
FIG. 31 is a side view of the clip of FIG. 27 with trimmer line installed, and bolt installed to install it on a carrier bar.

FIG. 31 is a side view of the clip of FIG. 27 with trimmer line installed, and bolts 225 installed to install it on a carrier bar.

Figure 32:
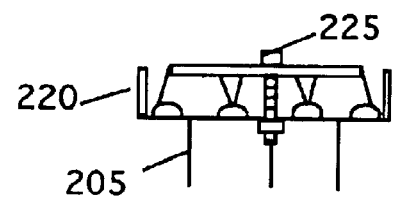
FIG. 32 is an end view of the clip of FIG. 27 shown mounted on a carrier bar.

FIG. 32 is an end view of the clip of FIG. 27 shown mounted on a carrier bar 210.

Figure 33:
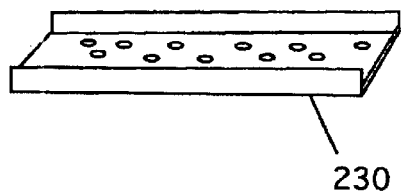
FIG. 33 is a side view of a clip type C used to hold trimmer line when mounted on a carrier bar used in the eighth embodiment of the invention.
Figure 36:
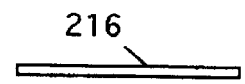
FIG. 36 is an end view of a carrier bar used in the eighth embodiment of the invention.
Figure 34:
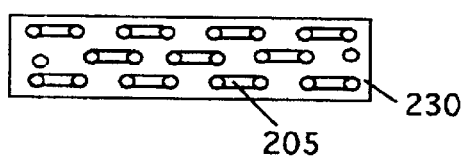
FIG. 34 is a top view of the clip shown in FIG. 33.
Figure 35:
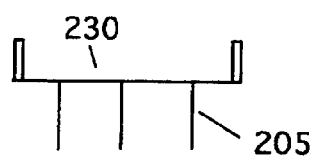
FIG. 35 is an end view of the clip shown in FIG. 33.

FIG. 33 is a side view of a clip type C 230 used to hold trimmer line when mounted on a carrier bar used in the eighth embodiment of the invention. Note that cap type C has two straight edges instead of the curved front edge of cap A. FIG. 34 is a top view of the clip shown in FIG. 33. FIG. 35 is an end view of the clip shown in FIG. 33. These views show the cap with trimmer line 205 installed. FIG. 36 is an end view of a carrier bar 210 used in the eighth embodiment of the invention.

Figure 37:
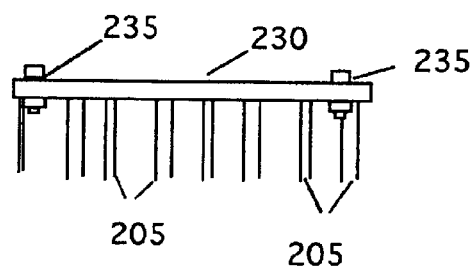
FIG. 37 is a side view of the clip of FIG. 33 with trimmer line installed, and bolt installed to install it on a carrier bar.
Figure 38:
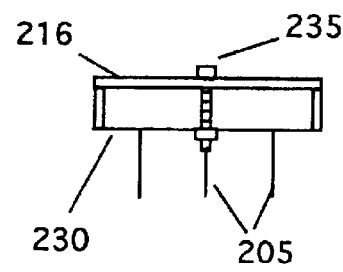
FIG. 38 is an end view of the clip of FIG. 33 shown mounted on a carrier bar.

FIG. 37 is a side view of the clip of FIG. 33 with trimmer line installed, and bolts b235 installed to install it on a carrier bar. FIG. 38 is an end view of the clip of FIG. 33 shown mounted on a carrier bar.

Figure 39:
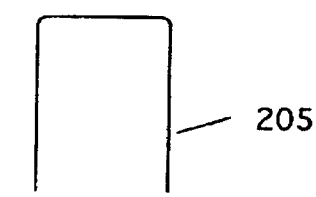
FIG. 39 is a detail view of a length of trimmer line bent in a staple form to be used in clips A, B or C or lawn mower blades.

FIG. 39 is a detail view of a length of trimmer line 205 bent in a staple form to be used in clips A, B or C or lawn mower blades. This trimmer line is that typically used in rotary weed trimmer. It is available in a number of different diameters and is typically sold in rolls.

Figure 40:
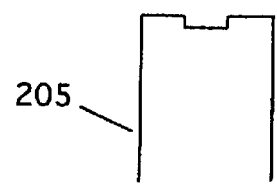
FIG. 40 is a detail view of a length of trimmer line bent in a threaded form to be used in clips A, B or C or lawn mower blades.

FIG. 40 is a detail view of a length of trimmer line 205 bent in a threaded or "bent U" configuration, to be used in clips A, B or C or lawn mower blades. The threaded form is discussed in more detail below. In this form, the trimmer line is passed through two sets of hole pairs, while the staple form is passed through one hole pair. The threaded form provides greater holding power, but takes more time to assemble.

Figure 41:
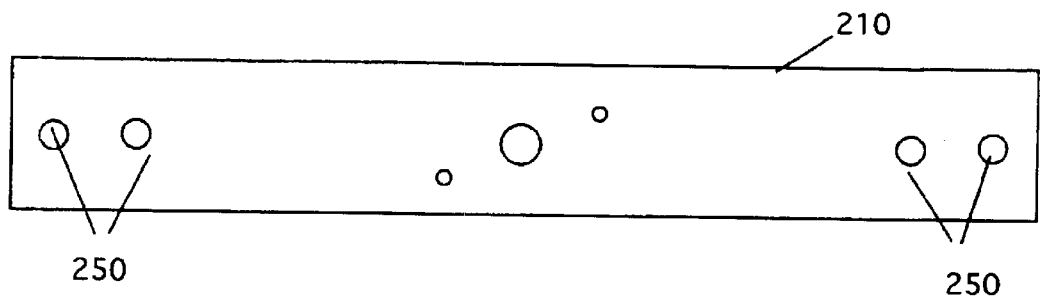
FIG. 41 is a top view of a carrier bar for a WALKER brand style mower using a modified EURO deck.
Figure 42:
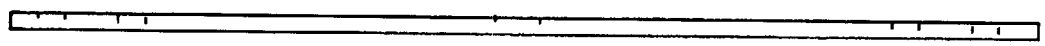
FIG. 42 is a side view of the carrier bar of FIG. 41.

FIG. 41 is a top view of a carrier bar 210 for a WALKER brand style mower using a modified 42-inch EURO deck. Note that the carrier bar 210 has mounting holes 250 for the clips A, B, or C as shown. FIG. 42 is a side view of the carrier bar 210 of FIG. 41.

Figure 43:
FIG. 43 is a top view of a drive/shear plate for a WALKER brand style mower.
Figure 44:
FIG. 44 is a side view of the plate shown in FIG. 43.

FIG. 43 is a top view of a drive/shear plate 251 for a WALKER brand style mower. FIG. 44 is a side view of the plate 251 shown in FIG. 43.

Figure 45:
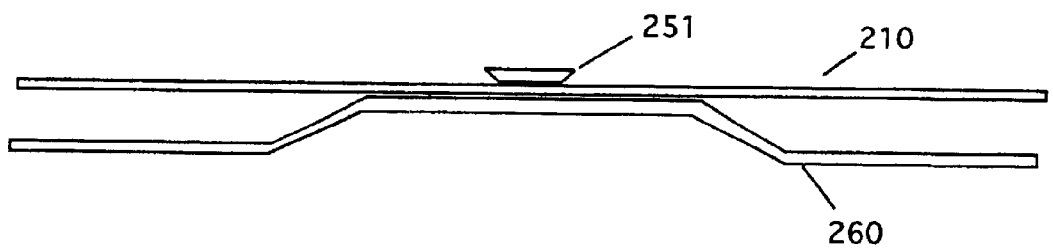
FIG. 45 is a side view of an assembled mower blade, carrier bar and drive/shear plate for a WALKER type mower.
Figure 46:
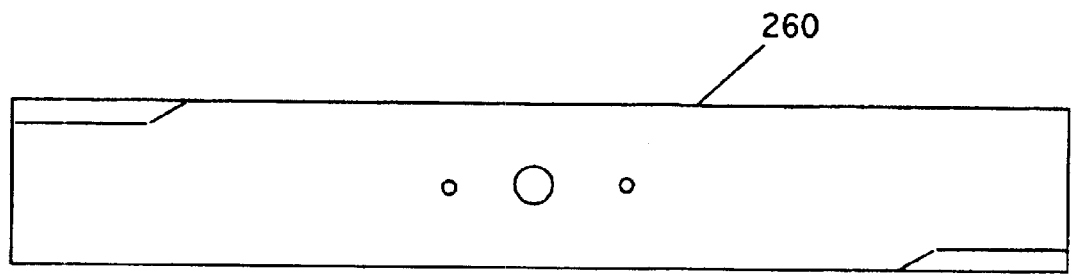
FIG. 46 is a top view of a WALKER mower blade.

FIG. 45 is a side view of an assembled mower blade 260, carrier bar 210 and drive/shear plate 251 for a WALKER type mower. FIG. 46 is a top view of a WALKER mower blade 260.

Figure 47:
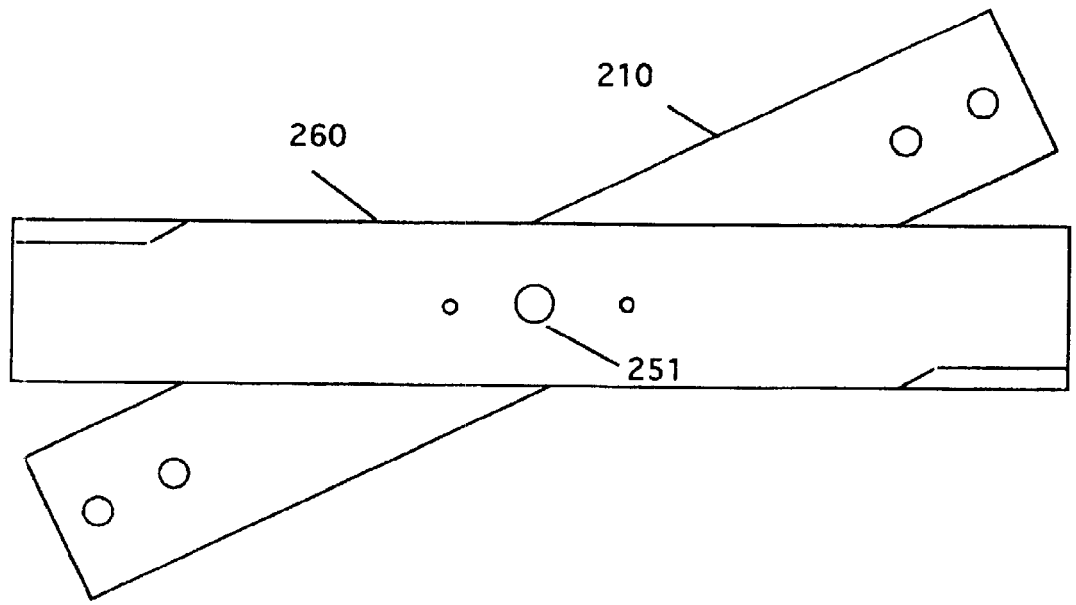
FIG. 47 is a top view of an assembled mower blade, carrier bar and drive/shear plate for a WALKER type mower.

FIG. 47 is a top view of an assembled mower blade 260, carrier bar 210 and drive/shear plate 251 for a WALKER type mower.

Figure 48:
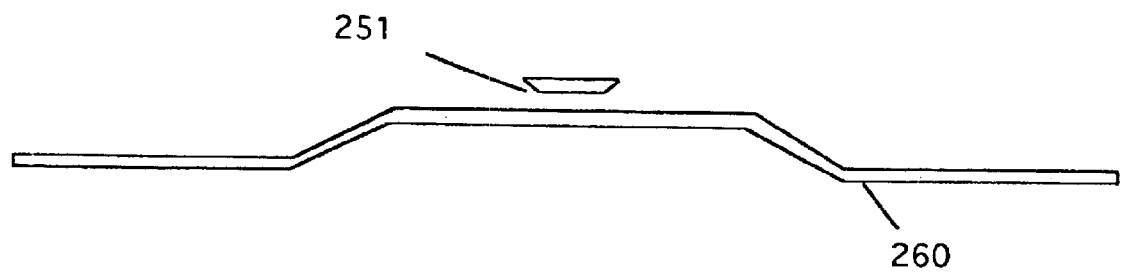
FIG. 48 is a side view of a WALKER mower blade.

FIG. 48 is a side view of a WALKER mower blade 260.

Figure 49:
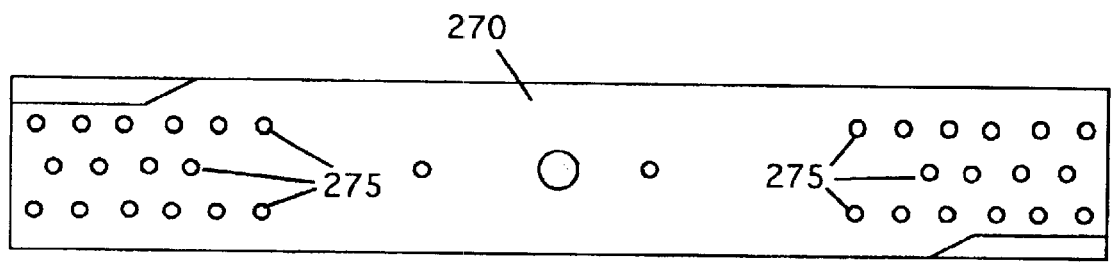
FIG. 49 is a top view of a WALKER mower blade modified to receive trimmer line.

FIG. 49 is a top view of a WALKER mower blade 270 modified to receive trimmer line. This blade 270 is a type used on all non-Euro style decks of 36", 42", 48"and other diameters. The blade is predrilled a series of holes 275 with to receive trimmer line. For de-thatching, install trimmer line using the staple format (see FIG. 39). To secure the trimmer line 205, tap the tops of the bent line with a hammer. This locks the line in place. You can also install a combination of staple format and threaded format, if desired.

Figure 50:
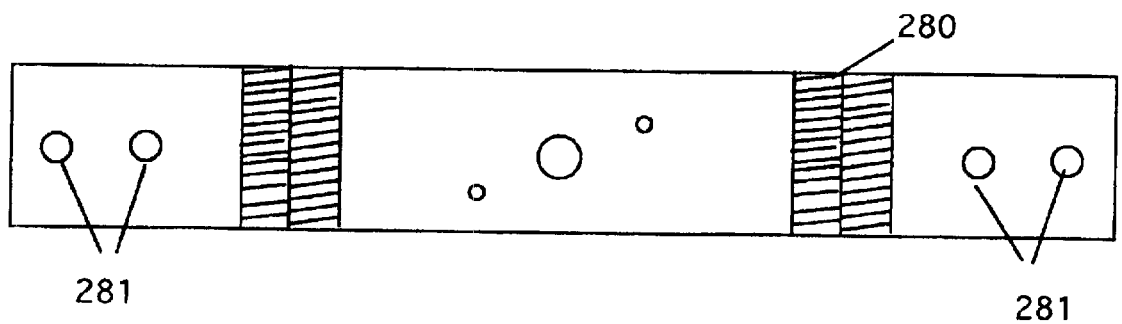
FIG. 50 is a top view of a WALKER carrier bar modified to receive clips A, B, and C.

FIG. 50 is a top view of a WALKER carrier bar 280 modified to receive clips A, B, and C. Note holes 281 that are used to secure the clips to the blade. Note that the hole pattern can be used on blades by other manufacturers as well.

Figure 51:
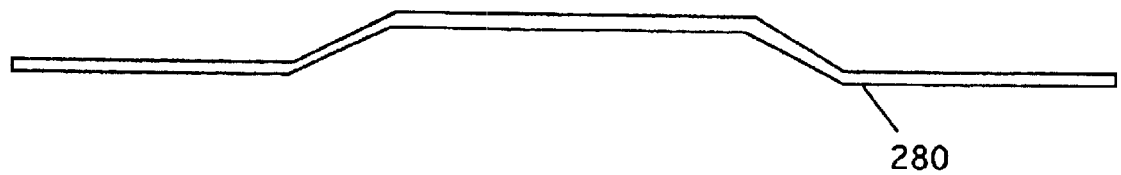
FIG. 51 is a side view of a WALKER carrier bar for a regular deck mower.

FIG. 51 is a side view of a WALKER carrier bar 280 for a regular deck mower.

Figure 52:
FIG. 52 is a side view of a WALKER main blade with carrier bar for a regular deck mower.

FIG. 52 is a side view of a WALKER main blade 290 used with the carrier bar 280 for a regular deck mower.

Figure 53:
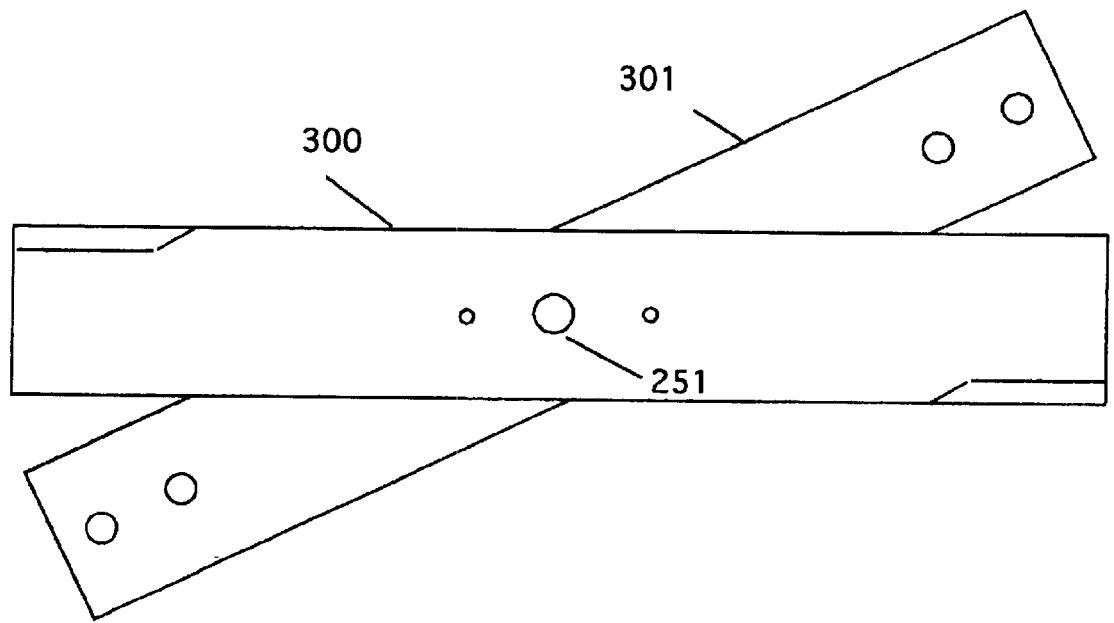
FIG. 53 is a top view of a main blade with carrier bar for a variety of mowers.

FIG. 53 is a top view of a main blade 300 with carrier bar 301 for use with a variety of mowers.

Figure 54:
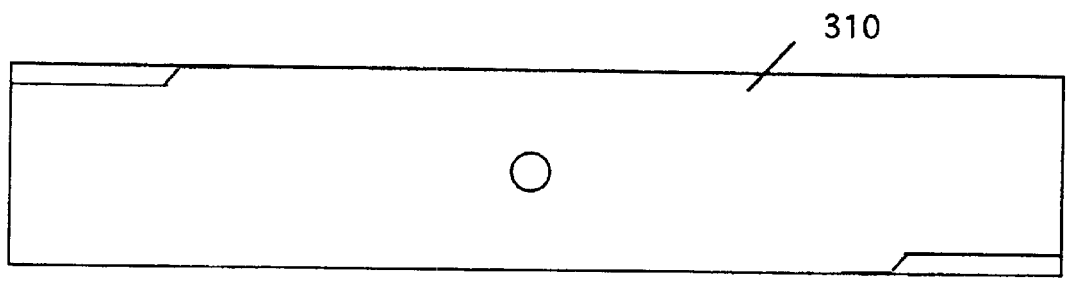
FIG. 54 is a top view of a WALKER main blade for use with a WALKER mulcher deck.

FIG. 54 is a top view of a WALKER main blade 310 for use with a WALKER mulcher deck, as prior art.

Figure 55:
FIG. 55 is a side view of a WALKER main blade for use with a WALKER mulcher deck.

FIG. 55 is a side view of a WALKER main blade 310 for use with a WALKER mulcher deck as prior art.

Figure 56:
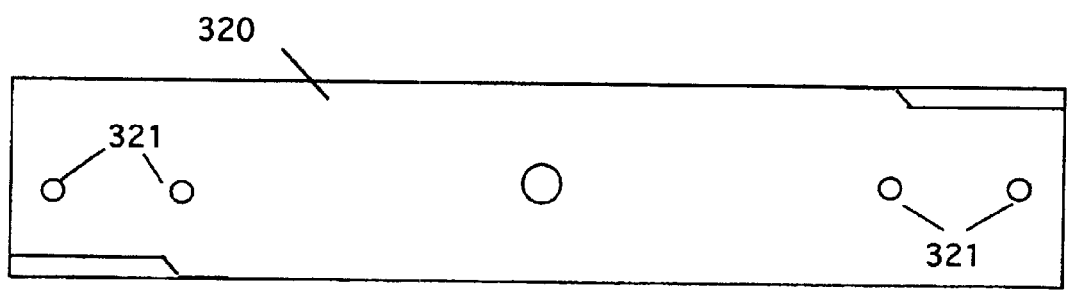
FIG. 56 is a top side view of a WALKER main blade for use with a WALKER mulcher deck prepared to receive clips A, B, or C.

FIG. 56 is a top side view of a WALKER main blade 320 for use with a WALKER mulcher deck prepared to receive clips A, B, or C. Note that holes 320 are used to secure the clips to the blade.

FIG. 57 is a side view of a second blade 340 for use with a WALKER mulcher deck.

FIG. 58 is an end view of a blade plate 341 to lock the blades in a WALKER mulcher deck.

FIG. 59 is a top view of a blade plate 341 of FIG. 59, used to lock the blades in a WALKER mulcher deck.

Figure 60:
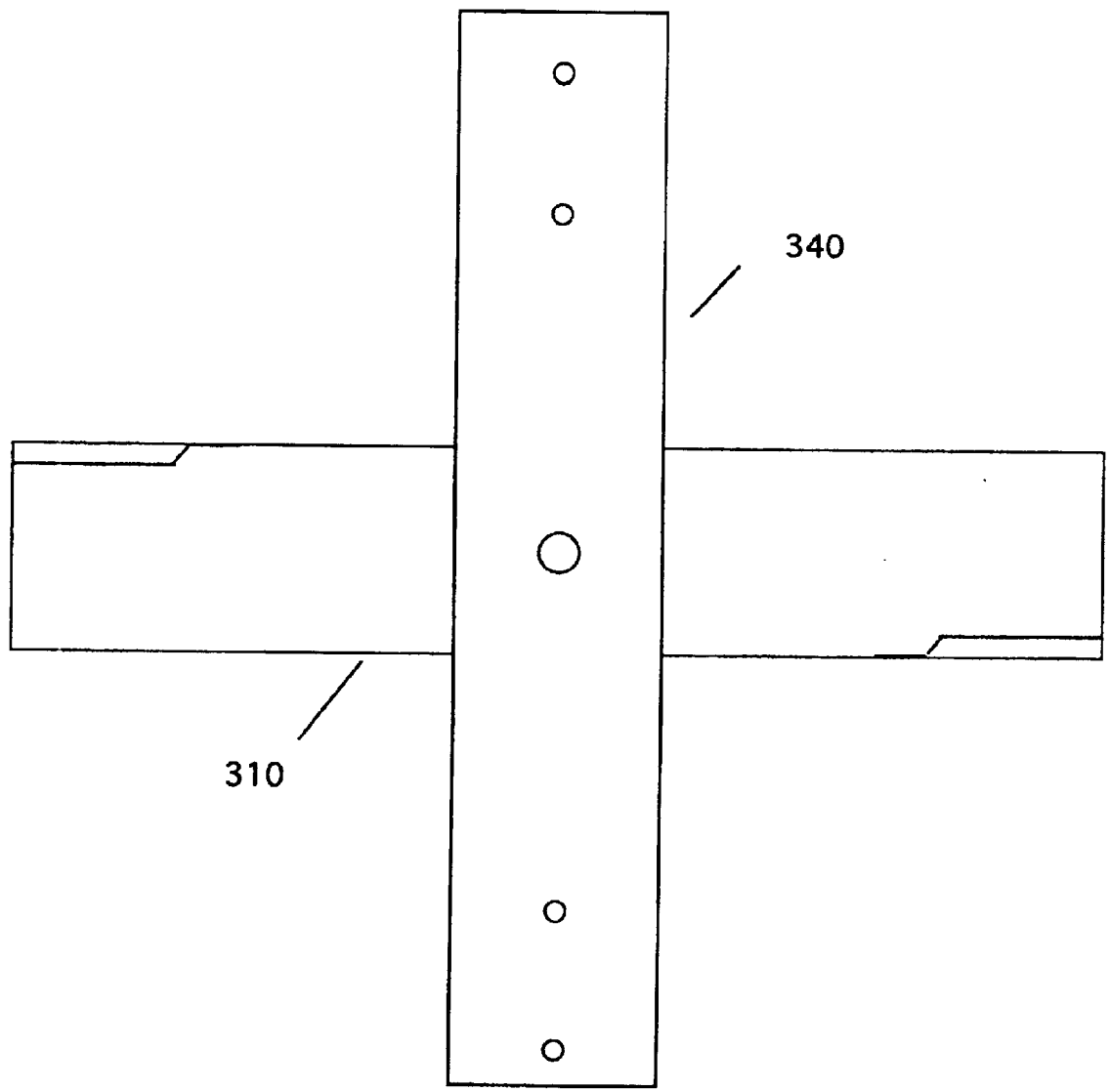
FIG. 60 is a top view of the assembled WALKER mulcher deck blades.

FIG. 60 is a top view of the assembled WALKER mulcher deck blades 340 plus 310, with the blade plate 341. Note that the assembly is attached to the drive stud 343 with a nut 342. See FIG. 61.

Figure 61:
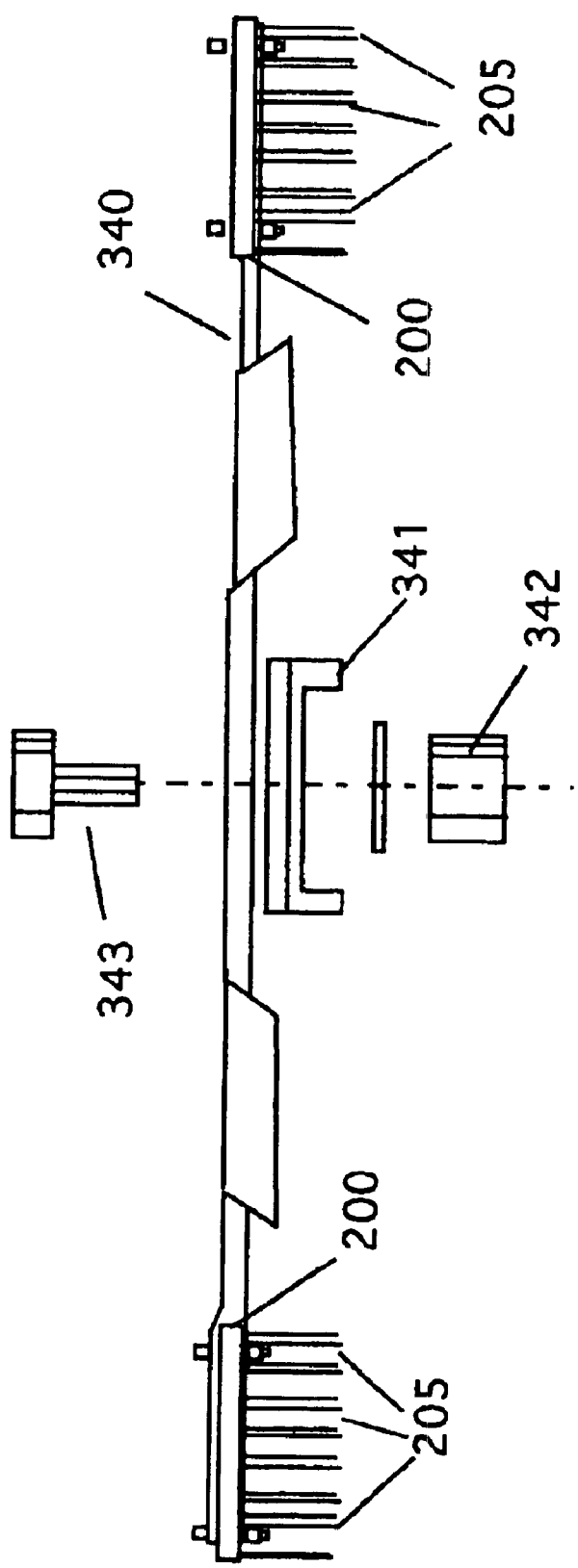
FIG. 61 is a side view of the assembled WALKER mulcher deck blades with clips and trimmer line attached.

FIG. 61 is a side view of the assembled WALKER mulcher deck blades as shown in FIG. 60 with clips 200 and trimmer line 205 attached.

Figure 62:
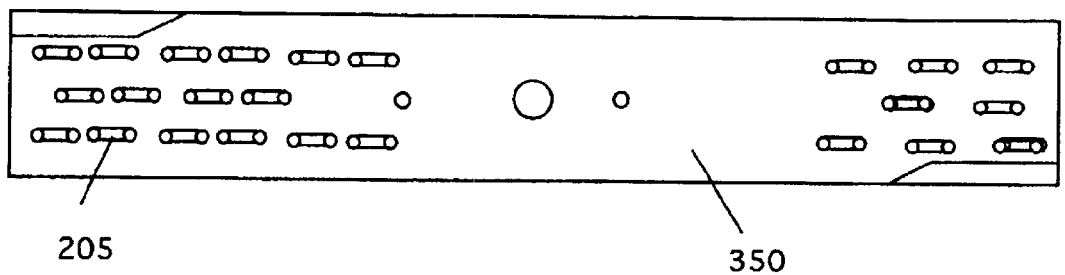
FIG. 62 is a top view of a blade for any type of rotary mower, modified to receive trimmer line.

FIG. 62 is a top view of a blade 350 for any type of rotary mower, modified to receive trimmer line.

Figure 63:
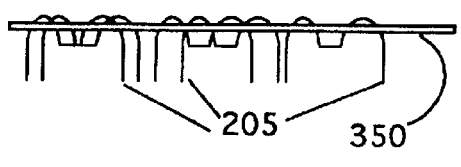
FIG. 63 is a side view of a blade with trimmer line installed using the threaded configuration of FIG. 40.

FIG. 63 is a side view of a blade with trimmer line 205 installed using the threaded configuration of FIG. 40.

Figure 64:
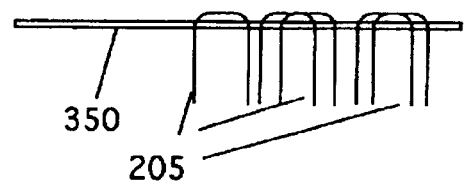
FIG. 64 is a side view of a blade with trimmer line installed using the staple configuration of FIG. 39.

FIG. 64 is a side view of a blade with trimmer line 205 installed using the staple configuration of FIG. 39. Note the different spacing of the two configurations.

Figure 65:
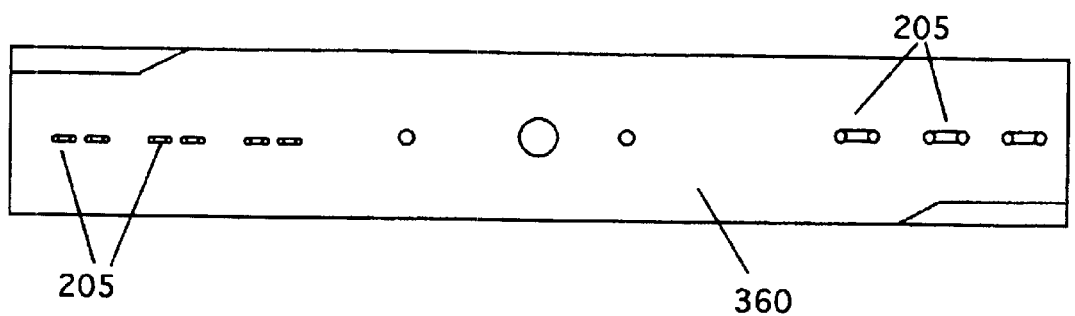
FIG. 65 is a top view of a blade for any type of rotary mower, modified to receive trimmer line in a single row configuration.

FIG. 65 is a top view of a blade 360 for any type of rotary mower, modified to receive trimmer line in a single row configuration.

Figure 66:
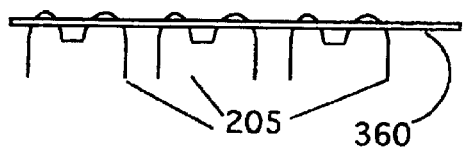
FIG. 66 is a side view of the blade of FIG. 65 with trimmer line installed using the threaded configuration of FIG. 40.

FIG. 66 is a side view of the blade 360 of FIG. 65 with trimmer line 205 installed using the threaded configuration of FIG. 40.

Figure 67:
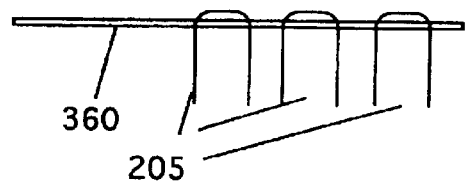
FIG. 67 is a side view of the blade of FIG. 65 with trimmer line installed using the staple configuration of FIG. 39.

FIG. 67 is a side view of the blade 360 of FIG. 65 with trimmer line 205 installed using the staple configuration of FIG. 39.

All of the above configurations are used on commercial type mowers. Typical applications include, de-thatching, removal of grass for overseeding with winter rye type grass.

FIGS. 68–74 cover another embodiment. These configurations are intended for use with rotary type weed trimmers. These trimmers can be either gas or electric operation.

Figure 68:
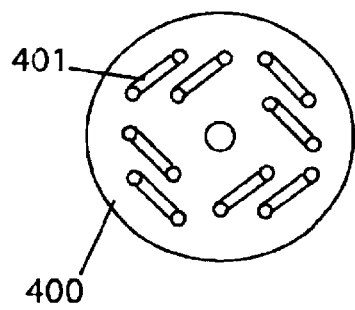
FIG. 68 is a top view of a plate, designed to receive trimmer line, for all types of weed trimmers.

FIG. 68 is a top view of a plate 400, designed to receive trimmer line, for all types of weed trimmers. Note that the plate 400 has a series of hole pairs 401 as shown.

Figure 69:
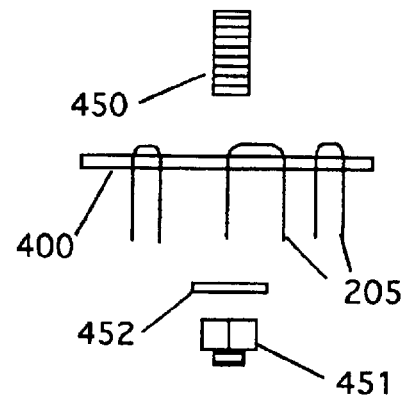
FIG. 69 is a side view of the plate of FIG. 68 with trimmer line installed using the staple configuration of FIG. 39.

FIG. 69 is a side view of the plate of FIG. 68 with trimmer line 205 installed using the staple configuration of FIG. 39. Also shown are the mounting stud 450, the locking bolt 451 and the lock washer 452.

Figure 70:
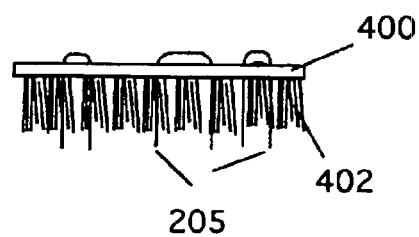
FIG. 70 is a side view of the plate of FIG. 68 with trimmer line installed using the staple configuration of FIG. 39 and also having a number of fused bristles.

FIG. 70 is a side view of the plate of FIG. 68 with trimmer line 205 installed using the staple configuration of FIG. 39 and having a number of fused bristles 402.

Figure 71:
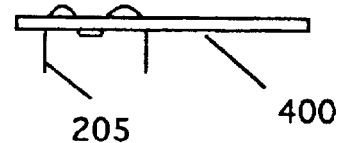
FIG. 71 is a side detail view of the plate of FIG. 68 with trimmer line installed using the threaded configuration of FIG. 40.

FIG. 71 is a side detail view of the plate of FIG. 68 with trimmer line 205 installed using the threaded configuration of FIG. 40.

Figure 72:
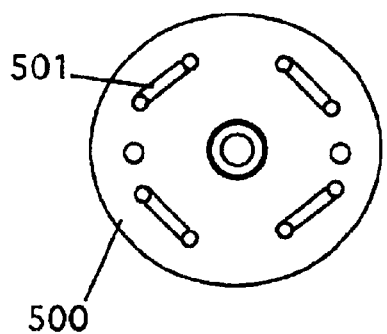
FIG. 72 is a top view of a plate modified for use with a SEARS CRAFTSMAN HASSLE-FREE trimmer.
Figure 73:
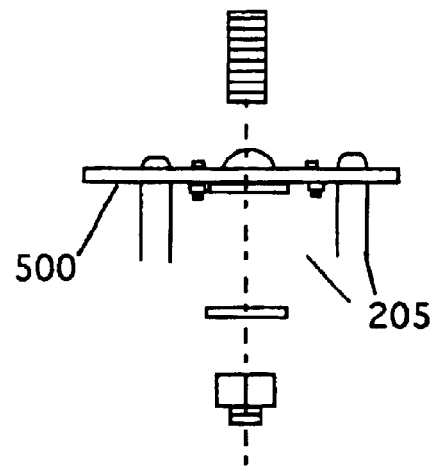
FIG. 73 is a side view of a plate with trimmer line installed, mounted on a HASSLE-FREE trimmer head.

FIG. 72 is a top view of a plate 500 modified for use with a SEARS CRAFTSMAN HASSLE-FREE trimmer. Note that the hole pairs 501 have been reduce because of the larger center bore 502 FIG. 73 is a side view of a plate 500 with trimmer line 205 installed, mounted on a HASSLE-FREE trimmer head.

Figure 74:
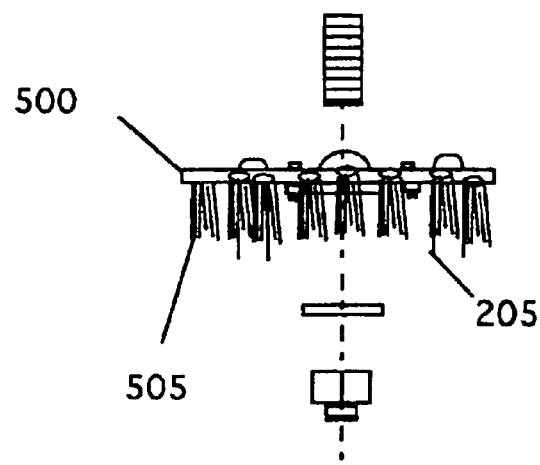
FIG. 74 is a side detail view of a plate with trimmer line and fused bristles installed, mounted on a HASSLE-FREE trimmer head.

FIG. 74 is a side detail view of a plate 500 with trimmer line 205 and fused bristles 505 installed, mounted on a HASSLE-FREE trimmer head.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

What is claimed is:

1. A thatching attachment for powered lawnmowers having a wheel-mounted housing, motive means mounted on said wheel-mounted housing, and a vertically disposed drive shaft comprising:

a) a generally rectangular mounting bar, said mounting bar having a plurality of hole pairs formed therein, b) a plurality of cutting elements, removably secured in said plurality of hole pairs and extending downward therefrom, each of said plurality of cutting elements being formed of a length of bent trimmer line, and further wherein each of said plurality of cutting elements has a length such that said plurality of cutting elements remains in a vertical position when said generally rectangular mounting bar is rotating at an operational speed; and c) means for removably attaching said mounting bar to said vertically disposed drive shaft.

2. The thatching attachment of claim 1 wherein the length of bent trimmer line is formed into a flat U shape.

3. The thatching attachment of claim 1 wherein the plurality of cutting elements further includes a plurality of bristle groups.

4. The thatching attachment of claim 3 each of said plurality bristle groups comprise:

a) a plurality of bristles; and b) a top cap, fixedly attached to said plurality of bristles.

5. The thatching attachment of claim 1 wherein the means for securing said plurality of cutting elements to said mounting bar comprise at least one cover plate, removably attached to said mounting bar.

6. A thatching attachment for rotary weed trimmers comprising:

a) a motor;

b) a drive stud, fixedly attached to said motor;

c) a circular, flat plate, removably attached to said drive stud, said circular flat plate having a plurality of hole pairs formed therein;

d) a plurality of cutting elements, removably installed within said plurality of hole pairs and extending downward therefrom, and further wherein each of said plurality of cutting elements has a length such that said plurality of cutting elements remains in a vertical position when said circular, flat plate is rotating at an operational speed; and e) further wherein the plurality of cutting elements comprises a plurality of bristle groups, wherein each bristle group includes a plurality of bristles, and a top cap fixedly attached to said plurality of bristles.

7. The thatching attachment of claim 6 wherein the plurality of bristle groups comprises a plurality of bent lengths of trimmer line.

* * * * *